D. M. ROGERS.
INSECT DESTROYING BOMB.
APPLICATION FILED JUNE 24, 1909.

954,591.

Patented Apr. 12, 1910.

Dexter M. Rogers, Inventor

Witnesses

By Geo. T. McCabe
Attorney

UNITED STATES PATENT OFFICE.

DEXTER M. ROGERS, OF BOSTON, MASSACHUSETTS.

INSECT-DESTROYING BOMB.

954,591.

Specification of Letters Patent. Patented Apr. 12, 1910.

Application filed June 24, 1909. Serial No. 504,090.

(DEDICATED TO THE PUBLIC.)

*To all whom it may concern:*

Be it known that I, DEXTER M. ROGERS, an employee of the Department of Agriculture of the United States of America, residing at 344 Cambridge street, Allston, Massachusetts, (whose post-office address is Boston, Massachusetts,) have invented a new and useful Improvement in Insect-Destroying Bombs.

This application is made under the act of March 3, 1883, chapter 143 (22 Stat., 625) and the invention herein described and claimed may be used by the Government of the United States or any of its officers or employees in the prosecution of work for the Government, or any person in the United States, without payment to me of any royalty thereon.

My invention relates to insect destroyers, and I describe it as an insect destroying bomb.

The object of my invention is to produce an insect destroyer which is cheap and inexpensive, and which can satisfactorily accomplish the destruction of leaf eating insects. In order to attain this result, I use an explosive device, commonly called a bomb, which contains dry poisons in the powdered form. This bomb is structurally arranged to explode when it reaches a certain height after being discharged from a gun adapted for such purpose. The explosion causes the poisonous substances to be distributed in the air and to gradually descend on the leaves of the tree intended to be treated. Various species of insects feed upon the foliage of trees, and every year they do great damage to all varieties of trees, rendering trees of little value for shade or fruit purposes. So far, no satisfactory device or method has been devised for the destruction of these insects. There have been insect destroyers invented calculated to relieve the injurious effects upon the foliage of trees due to insects, but such devices have not been very successful, because in applying poisons to the foliage by the use of these devices, considerable time is consumed, attended by much labor and effort, and they are practically useless to reach all parts of the foliage of trees. Whereas, in using my bomb, much time and labor is saved, and the poisonous substances are so distributed as to cover and settle on all the foliage of the tree, thereby reaching all places inaccessible to other insect destroyers.

The nature, characteristic features, and scope of the invention will be more readily understood from the following description taken in connection with the accompanying drawing, forming a part hereof, wherein—

Figure 1:
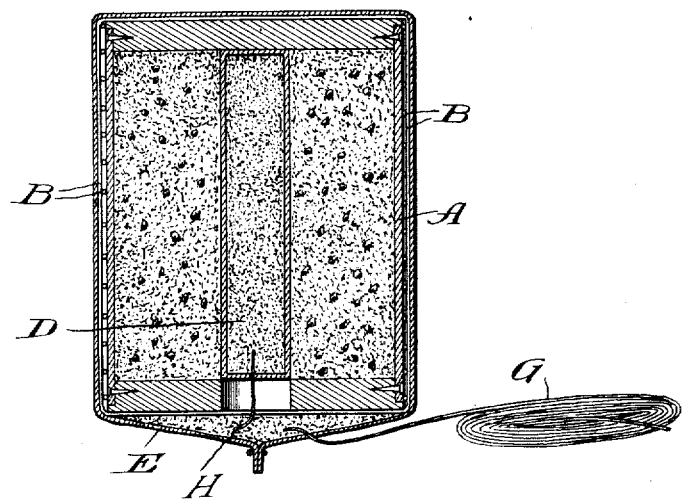
Figure 2:
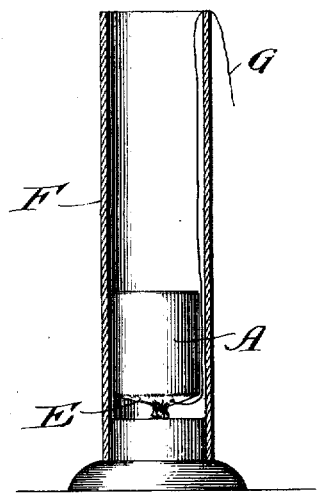
Figure 3:
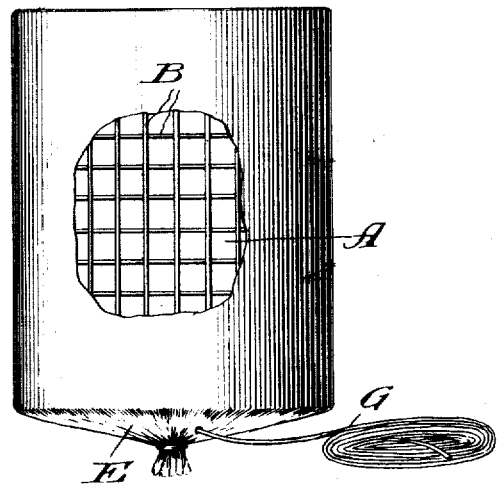

Figure 1, is a longitudinal sectional view of my invention; Fig. 2, is an elevational view of my invention, ready to be discharged from the gun; and Fig. 3, is a side view of my invention.

Referring to the drawing, A represents the container or holder in which the poisonous substances desired to be scattered over the foliage of trees is placed. This container or holder is a paper carton, cylindrically shaped, having wooden ends tacked in. The heads are flanged, thereby permitting the container or paper cylinder, A, to fit in the bomb so as to be of even size its whole length.

The container or holder, A, is covered with cord, B. The cord, B, is wound tightly around the container or holder, A, in both directions and from side to side and head to head, making a network of approximately one-half inch mesh for the purpose of giving more resistance than the paper carton offers. The container, A, and the cord, B, are covered securely and tightly with a sheet of tough paper. Through one of the heads of the container, A, is bored a hole, sufficiently large to admit the introduction of an inner container, D. This inner container, D, is cylindrically shaped and is adapted for use in receiving and holding the powder required for exploding the bomb. At the lower end of the outer cover of the bomb is a pocket, E, wherein is placed a charge of powder. This powder is used in discharging or elevating the bomb from the gun, F. In order to elevate the bomb, it is essential to ignite the fuse, G, which is attached to the exterior of the bomb and runs perpendicularly therewith to the pocket, E. The fuse, G, when ignited, causes the powder in the pocket, E, to explode, and as a result, the bomb is elevated or forced up in the air to a proper height, and the explosion of the bomb while in the air is caused by the fuse, H, attached to the inner container, D, receiving its ignition from the burning powder in the pocket, E, and thereby igniting the powder in the inner container, D.

The gun, F, which I employ in aiding the elevation of the bomb in the air is a common paper cylinder gun, having an iron base, and is such as is ordinarily used in exploding fireworks on the Fourth of July.

The ingredients which I place in the container or holder, A, for the destruction of insects are, arsenate of lead, barium sulfate, and zinc sulfid. I do not confine myself to these particular ingredients, but any poisonous ingredients known to be fatal to insects may be used in said container, A. With these ingredients I mix grains of coarse sand or fine gravel, for the purpose of breaking up the arsenate of lead and other poisonous ingredients when the bomb is exploded, and thereby aid the freer distribution of such substances.

In practicing my invention, I place the bomb in the gun F, at a reasonable distance from the tree, the foliage of which it is desired to cover or treat with poison. The bomb is then directed at an angle with a view of causing it to ascend and explode over or nearly over the proper tree. I then ignite the fuse, G, which extends over the gun, F, thereby causing the ignition of the powder in the pocket, E, in the bottom of the outer cover. The explosion of the powder in the pocket, E, forces the bomb upward to the required height in the air, and the fuse, H, becomes ignited from the burning powder in said pocket, E, while the bomb is ascending, thereby causing the ignition of the powder in the inner container, D, which produces an explosion, and the poisonous ingredients are distributed in the air and gradually settle upon the foliage of the tree or trees infested with insects. The area covered by the falling poisons after being exploded in the air, as herein described, varies according to the quantity of poisonous ingredients contained in the bomb and the charge of powder to effect such explosion. The average area covered by 10 ounces of poison so distributed, is 100 feet in diameter. The powder I use in elevating and exploding this bomb is the ordinary black powder, but any kind of powder which accomplishes the same results may be used.

My invention should be used preferably for destroying insects after a rain fall or heavy dew, for the reason that the leaves are moist or wet, and this condition aids the poisonous substances to adhere to the leaves.

Having thus described my invention, I claim:

1. An insect destroying bomb having a container, poisonous substance therein, an inner container, explosive material therein, and a pocket charged with powder, with means for igniting the powder and thereby the explosive for elevating and exploding such bomb and distributing said poisonous ingredients substantially as specified.

2. An insect destroying bomb having a container charged with poisonous substances, an inner container charged with powder and a pocket charged with powder, a fuse for igniting the powder in said inner container, and a fuse for igniting the powder in said pocket, whereby the bomb is elevated and exploded to scatter the poisonous ingredients for the destruction of insects, substantially as specified.

3. An insect destroying bomb consisting of a container having poisonous ingredients therein, a pocket charged with powder, a fuse for igniting said powder, and a container charged with powder, a fuse for transmitting ignition to the powder in said container, explosive means for the elevation thereof, and explosive means for breakage and scattering poisonous ingredients for the destruction of insects, substantially as specified.

4. An insect destroying bomb consisting of a container having poisonous ingredients therein, explosive means for discharging said bomb from a gun for ascension, and means for exploding said bomb in the air and distributing poisonous ingredients for the destruction of insects, substantially as specified.

5. An insect destroying bomb having a container filled with poisonous ingredients, a resisting network incasing tightly said container, a pocket charged with powder, and a container charged with powder, a fuse for igniting the powder in said pocket, and a fuse transmitting ignition to the powder in said container, a covering for said parts, explosive means for elevation and breakage of said bomb, and means for breaking up and showering poisons for the destruction of insects, substantially as specified.

6. A bomb for distributing substances over the foliage of trees comprising a casing, strengthening strands spaced about the periphery of the casing, a centrally located chamber within the casing containing an explosive, a substance to be distributed mixed with a hard granular substance as gravel within the space between the central chamber and the walls of the casing, a firing charge of explosive held on the exterior of the casing, a fuse leading from the firing charge to the central chamber within the casing, and a firing fuse leading to the firing charge.

In testimony whereof I affix my signature in the presence of two subscribing witnesses.

DEXTER M. ROGERS.

Witnesses:
ARTHUR L. CONNOLLY,
HARRY B. DALTON.